United States Patent [19]

Otobe

[11] Patent Number: 4,528,968

[45] Date of Patent: Jul. 16, 1985

[54] DUTY RATIO CONTROL METHOD FOR ON-OFF TYPE SOLENOID VALVES

[75] Inventor: Yutaka Otobe, Shiki, Japan

[73] Assignee: Honda Giken Kogyo K.K., Tokyo, Japan

[21] Appl. No.: 623,313

[22] Filed: Jun. 22, 1984

[30] Foreign Application Priority Data

Jun. 22, 1983 [JP] Japan ................................ 58-112300

[51] Int. Cl.³ ........................................... F02M 25/06
[52] U.S. Cl. .................................................. 123/571
[58] Field of Search ............... 123/478, 480, 486, 487, 123/568, 571, 608, 609

[56] References Cited

U.S. PATENT DOCUMENTS

| | | | |
|---|---|---|---|
| 4,164,206 | 8/1979 | Toelle | 123/571 |
| 4,173,205 | 11/1979 | Toelle | 123/571 |
| 4,233,947 | 11/1980 | Abo | 123/571 |
| 4,380,988 | 4/1983 | Otsuka et al. | 123/571 |
| 4,448,177 | 5/1984 | Hasegawa et al. | 123/571 |
| 4,452,217 | 6/1984 | Kawamura et al. | 123/571 |
| 4,462,378 | 7/1984 | Atago et al. | 123/571 |

FOREIGN PATENT DOCUMENTS 0082302  6/1980  Japan ................................ 123/571

Primary Examiner—Parshotam S. Lall
Assistant Examiner—W. R. Wolfe
Attorney, Agent, or Firm—Arthur L. Lessler

[57] ABSTRACT

A valve opening duty ratio determining the valve opening period of an on-off type solenoid valve is calculated as a function of at least one control parameter, each time a pulse of a predetermined timing signal is generated. A valve closing duty ratio determining the valve closing period of the solenoid valve is calculated when the calculated valve opening duty ratio is larger than a predetermined value. A pulse of a reference control signal is generated after completion of the calculation of the valve opening duty ratio or the valve closing duty ratio. Time elapsed after generation of the reference control signal pulse is measured. When the calculated valve opening duty ratio is smaller than a predetermined value, the solenoid valve is opened for a period of time after generation of the above reference control signal pulse and until the elapsed time measured reaches a value corresponding to the calculated valve opening duty ratio. When the calculated valve opening duty ratio is larger than the predetermined value, the valve is closed for a period of time after generation of the reference control signal pulse and until the elapsed time measured reaches a value corresponding to the calculated valve closing duty ratio.

6 Claims, 5 Drawing Figures

DUTY RATIO CONTROL METHOD FOR ON-OFF TYPE SOLENOID VALVES

BACKGROUND OF THE INVENTION

This invention relates to a method of controlling a duty ratio with which an on-off type solenoid valve is to be opened, and more particularly to a method of this kind which is adapted to perform control of an on-off type solenoid valve in a manner parallel with control of one or more other controlling means, with the latter having priority to the former control, by means of a microcomputer.

In controlling the duty ratio of opening of an on-off type solenoid valve, i.e., the pulse duty factor of a driving signal for driving the valve, for example, in controlling the duty ratio of opening of a valve of this kind for regulating an exhaust gas recirculation amount in an internal combustion engine (hereinafter called "the EGR control valve"), in a manner parallel with control of another controlling means, for instance, a fuel injection device, with the latter having priority to the former, by means of a single microcomputer, i.e. an electronic control unit (hereinafter called "the ECU"), if an interrupt signal commanding execution of the control of the fuel injection device and an interrupt signal commanding execution of the control of the EGR control valve are inputted to the ECU almost at the same time, the ECU executes the control of the fuel injection device prior to the control of the EGR control valve, and after completion of the execution of the former control, it executes the control of the latter. This manner of priority control can often result in irregularities in the pulse repetition period of the driving signal for the EGR control valve. As a consequence, when the pulse duty factor of the driving signal is set to a value close to 100%, it can happen that adjacent pulses of the driving signal are generated in a manner substantially continuous with each other. This causes the EGR control valve to open with a substantial duty ratio larger than the actually required duty ratio, resulting in an inaccurate exhaust gas recirculation amount.

SUMMARY OF THE INVENTION

It is the object of the invention to provide a duty ratio control method for an on-off type solenoid valve, which can permit the solenoid valve to operate with accuracy so as to achieve an exactly required control amount even with a large duty ratio, if the solenoid valve is controlled in a manner parallel with control of one or more other controlling means with the latter having priority to the former, by means of a single microcomputer.

The present invention provides a control method of controlling an on-off type solenoid valve, which comprises the following steps:

(1) calculating a valve opening duty ratio determining the valve opening period of the solenoid valve, as a function of at least one control parameter, each time a pulse of a predetermined timing signal is generated;

(2) comparing the valve opening duty ratio calculated in the step (1) with a predetermined value;

(3) calculating a valve closing duty ratio determining the valve closing period of the solenoid valve when the calculated valve opening duty ratio is larger than the predetermined value;

(4) generating a pulse of a reference control signal after completion of the calculation of the valve opening duty ratio in the step (1) and the calculation of the valve closing duty ratio in the step (3);

(5) measuring time elapsed after generation of the pulse of the reference control signal;

(6) causing the solenoid valve to open for a period of time after generation of the pulse of the reference control signal and until the elapsed time measured in the step (5) reaches a value corresponding to the valve opening duty ratio calculated in the step (1), when the calculated valve opening duty ratio is smaller than the predetermined value;

(7) causing the solenoid valve to close for a period of time after generation of the pulse of the reference control signal and until the elapsed time measured in the step (5) reaches a value corresponding to the valve closing duty ratio calculated in the step (3), when the calculated valve opening duty ratio is larger than the predetermined value.

Preferably, the above step (6) includes causing the solenoid valve to close for a period of time after the elapsed time measured in the step (5) reaches the value corresponding to the calculated valve opening duty ratio and until a pulse of the reference control signal immediately following the first-mentioned pulse thereof is generated.

Also preferably, the above step (7) includes causing the solenoid valve to open for a period of time after the elapsed time measured in the step (5) reaches the value corresponding to the calculated valve closing duty ratio and until a pulse of the reference control signal immediately following the first-mentioned pulse thereof is generated.

Further, preferably, the calculation of the valve closing duty ratio of the step (3) is effected on the basis of the valve opening duty ratio calculated in the step (1).

Also, preferably, the method according to the invention may further include the step of executing a process for control of a controlling means other than the on-off type solenoid valve, in synchronism with generation of a predetermined interrupt signal. If the interrupt signal is generated to command execution of the process for control of the other controlling means when the calculation of the valve opening duty ratio of the step (1) is to be executed, the process for control of the other controlling means is executed preferentially to the calculation of the valve opening duty ratio of the step (1).

The on-off type solenoid valve includes a solenoid valve used in a control means for controlling the amount of exhaust gas recirculated to the intake pipe of an internal combustion engine.

The above and other objects, features, and advantages of the invention will be more apparent from the ensuing detailed description taken in conjunction with the accompanying drawings.

3

Figure 2:
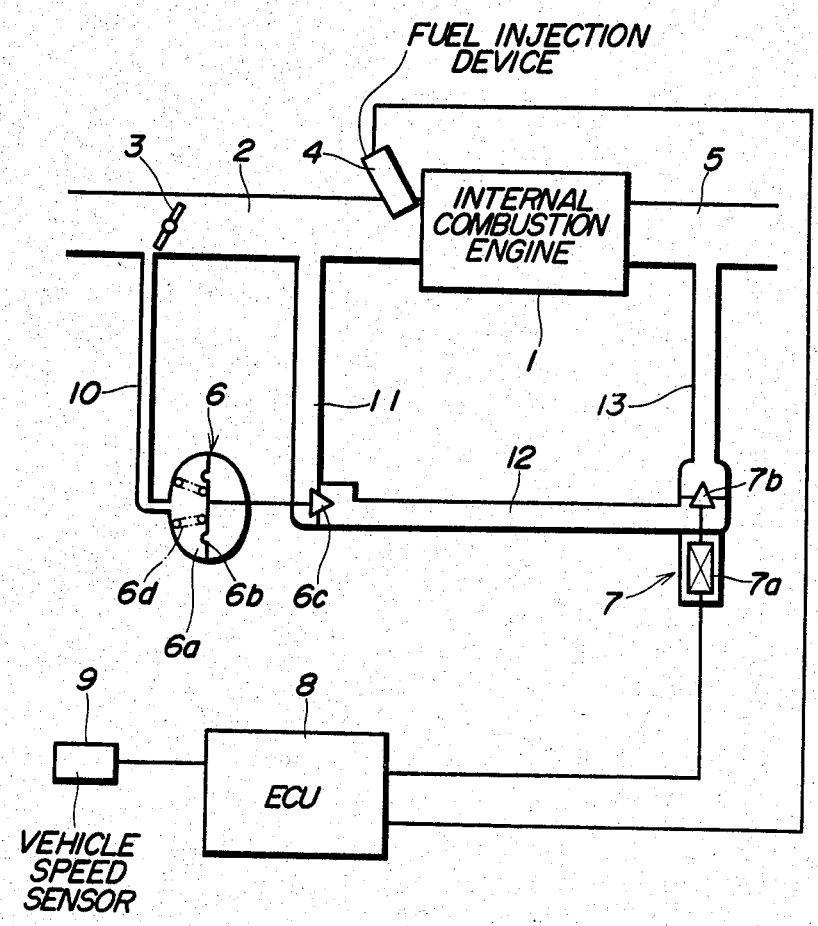
FIG. 2 is a schematic view illustrating the arrangement of an internal combustion engine, to which is applied the method according to the present invention.
Figure 3:
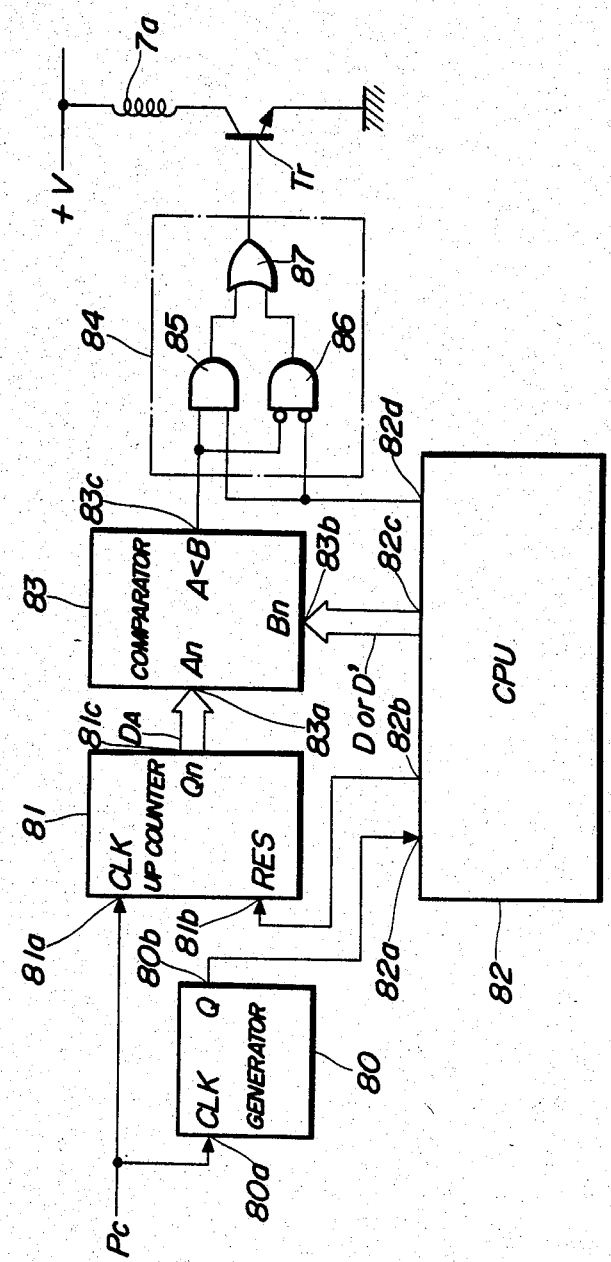
FIG. 3 is a circuit diagram showing the interior construction of the ECU in FIG. 2, having an exemplary control circuit for the EGR control valve in FIG. 2.
Figure 4:
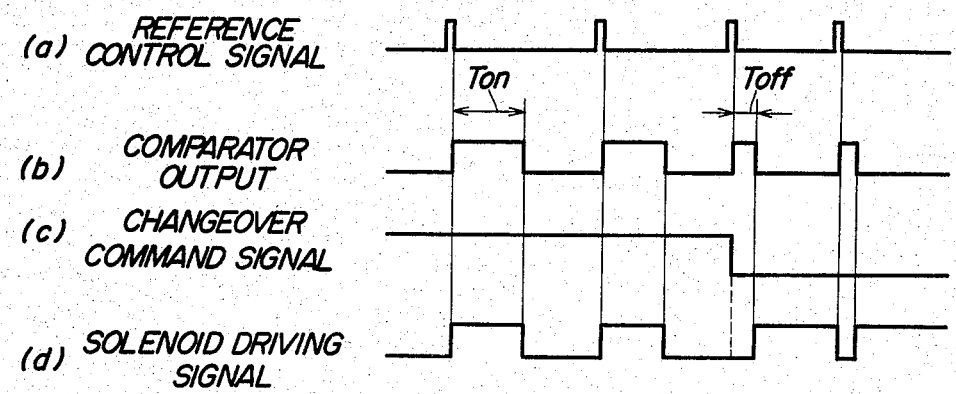
Figure 5:
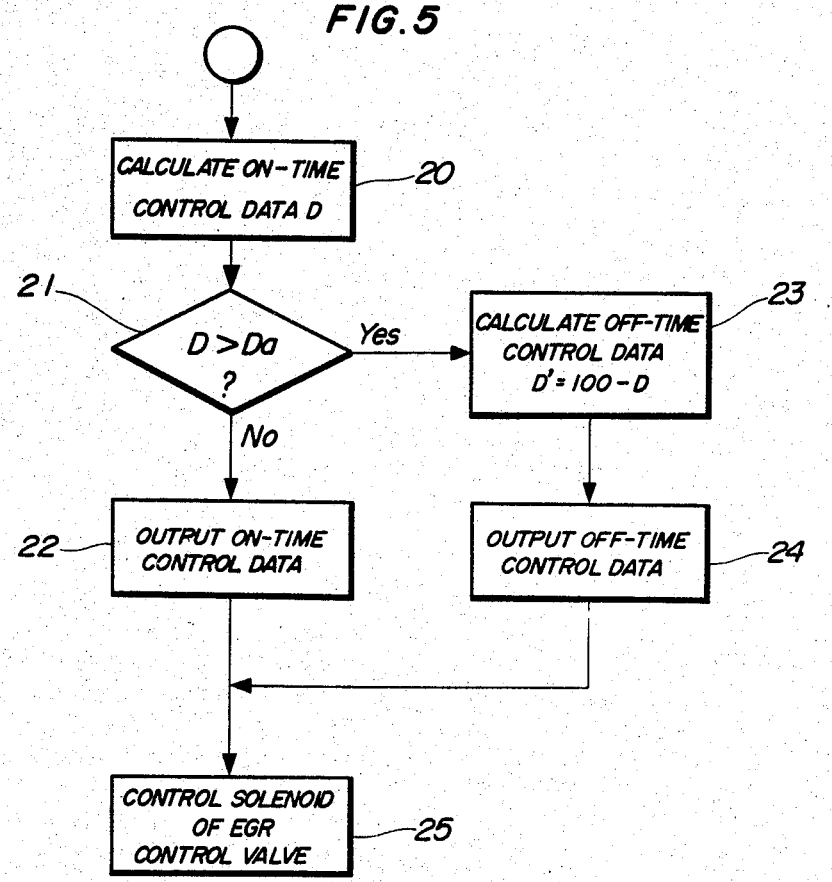

FIG. 4, a-d is a timing chart of generation of various signals available with the circuit of FIG. 3, given to show a manner of control of the EGR control valve in FIG. 2, according to the method of the invention; and FIG. 5 is a flowchart showing a manner of control of duty ratios for opening and closing the EGR control valve, executed by the ECU in FIG. 2.

DETAILED DESCRIPTION

Figure 1:
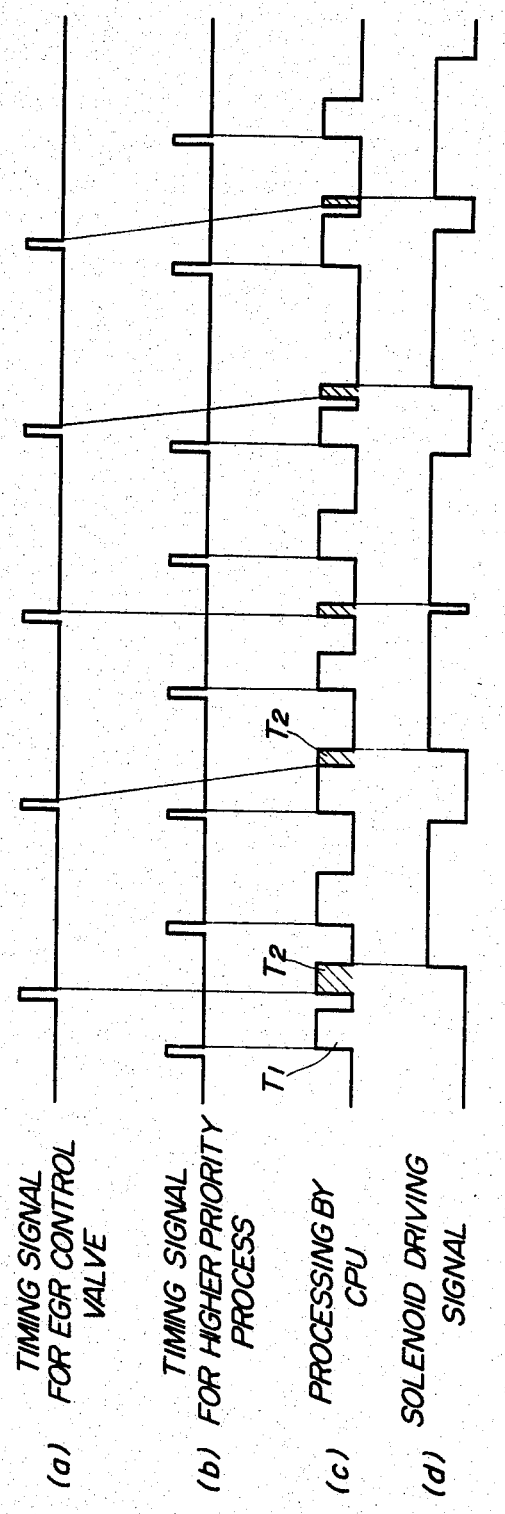
FIG. 1, a–d is a timing chart of generation of various signals, given to show a manner of control of an EGR control valve according to a conventional duty ratio control method.

Referring first to FIG. 1, there is shown a timing chart given to show a manner of control of an EGR control valve according to a conventional duty ratio control method. In (a) of FIG. 1, a timing signal is shown, in synchronism with which is controlled the EGR control valve, while in (b) of the same figure is shown another timing signal in synchronism with which is controlled a controlling means other than the EGR control valve, such as a fuel injection device of an internal combustion engine, which is controlled with higher priority to the EGR control valve. In the shown example, therefore, the timing signal for the other controlling means serves as an interrupt signal such that upon inputting of each pulse of the same timing signal to the ECU, the ECU executes the process for control of the other controlling means preferentially to the process for control of the EGR control valve. This preferential processing is performed over a time period T1 shown in (c) of FIG. 1, and the process for control of the EGR control valve is started after termination of the preferential processing and executed over a time period T2 in (c) of FIG. 1. As a consequence of this manner of control, pulses of a driving signal for causing the EGR control valve to open can be generated with irregular pulse repetition periods as shown in (d) of the figure. With this manner of priority control, if the duty ratio with which the EGR control valve is to be opened is set to a value close to 100%, adjacent pulses of the driving signal can often be generated continuously without separation or with a very small separation. In such event, the EGR control valve is continuously held in an open state without closing, or it is opened before it becomes completely closed, resulting in inaccurate control of the exhaust gas recirculation amount.

FIG. 2 schematically shows the arrangement of an internal combustion engine to which is applied the method according to the present invention. Reference numeral 1 designates the main body of an internal combustion engine which is of the multi-cylinder type. An intake pipe 2 and an exhaust pipe 5 are arranged, respectively, at an intake side and an exhaust side of the engine main body, with a throttle valve 3 arranged in the intake pipe 2. A fuel injection device 4 comprises fuel injection valves each projected into the intake pipe 2 at a location between the engine main body 1 and the throttle valve 3 and slightly upstream of an intake valve of a corresponding engine cylinder. Each of the fuel injection valves of the fuel injection device 4 is mechanically connected to a fuel pump, not shown, and electrically connected to the ECU 8 to be controlled in valve opening period by a control signal from the ECU 8.

Serially connected conduits 11–13 extend from the exhaust pipe 5 and is connected to the intake pipe 2 at a location between the engine main body 1 and the throttle valve 3. At the junction between the conduits 11 and 12 is arranged an exhaust recirculation valve 6 of the vacuum-responsive type, whose valve body 6c is disposed across the same junction and coupled to a diaphragm 6b to be driven thereby for opening and closing the conduits 11, 12. The valve 6 has a vacuum chamber 6a communicating through a conduit 10 with the interior of the intake pipe 2 at a location in the vicinity of the throttle valve 3. One end of the conduit 13 communicates with the interior of the exhaust pipe 5, while the junction of the other end of the conduit 13 with the conduit 12 is provided with the EGR control valve 7 whose valve body 7b is disposed in the junction to open and close same. The EGR control valve 7 is of the solenoid-operated type and has its solenoid 7a electrically connected to the ECU 8. Further electrically connected to the ECU 8 are a vehicle speed sensor 9, a throttle valve opening sensor, an engine cooling water temperature sensor, an intake pipe absolute pressure sensor, an engine rotational speed sensor, none of which are shown, etc. to supply the ECU 8 with sensed signals indicative of respective operating parameters of the engine. The ECU 8 operates on these input parameter signals to control the fuel supply quantity of the engine 1, and also operates on an output signal from the vehicle speed sensor 9 to perform on-off control of the EGR control valve 7 for control of the exhaust gas recirculation amount, in a manner hereinafter described.

FIG. 3 shows an example of the interior construction of the ECU 8 in FIG. 2, showing in particular detail a block for controlling the EGR control valve 7 in FIG. 2. In the figure, a reference clock signal Pc is generated from a reference clock generator, not shown, and is supplied to a duty ratio control signal generator (hereinafter merely called "the counter") 80, and an up counter 81, at respective clock pulse input terminals 80a and 81a. The counter 80 has its output terminal 80b connected to an input terminal 82a of a central processing unit (hereinafter called "the CPU") 82, which has an output terminal 82b connected to a reset pulse input terminal 81b of the up counter 81.

The up counter 81 has its output terminal 81c connected to an input terminal 83a of a comparator 83, which has its other input terminal 83b connected to a duty ratio control data output terminal 82c of the CPU 82, and its output terminal 83c connected to input terminals of an AND circuit 85 and a NAND circuit 86 forming a changeover circuit 84. The CPU 82 has a further output terminal 82d for generating an on-off control changeover command signal, connected to the other input terminals of the above AND circuit 85 and the NAND circuit 86, which in turn have their output terminals connected to input terminals of an OR circuit 87. The OR circuit 87 has its output terminal connected to the base of a transistor Tr which in turn has its collector connected to a power supply, not shown, by way of the solenoid 7a of the aforementioned EGR control valve 7 in FIG. 1, and its emitter grounded.

With the above arrangement, the duty ratio control signal generator 80 counts reference clock pulses Pc supplied thereto, and generates a pulse of a timing signal for control of the EGR control valve and supplies same to the CPU 82, each time its count reaches a predetermined value. The CPU 82 acts in response to each pulse of the timing signal supplied thereto, to generate a pulse of a reference control signal [(a) of FIG. 4] through its output terminal 82b. When each pulse of another timing signal is inputted to the CPU 82, in synchronism with which is controlled a controlling means other than the EGR control valve 7, such as the fuel injection device 4, which is controlled with higher priority to the EGR control valve, the CPU 82 executes the process for control of the above other controlling means prior to the process for control of the EGR control valve, in synchronism with the another timing signal. That is, the CPU 82 does not generate a pulse of the above reference control signal of (a) of FIG. 4 until after it has finished the process for control of the other controlling means and immediately after it finishes calculating a control data value D or D', hereinafter referred to. As a consequence, pulses of the reference control signal of (a) of FIG. 4 are not generated with a constant pulse repetition period.

FIG. 5 shows a control program for executing the control of the duty ratio with which the EGR control valve is driven, which is executed within the ECU 8. This control program is executed only when the vehicle speed sensed by the aforementioned vehicle speed sensor 9 is within a predetermined range, e.g. within a range from 15 to 45 km/hr. First, the CPU 82 calculates the value or on-time control data D for the EGR control valve in response to operating parameters of the engine, at the step 20. The value of on-time control data D represents the ratio of the valve opening period of the EGR control valve 7 to the time interval of adjacent pulses of the timing signal generated by the duty ratio control signal generator 80 and is represented in percentage. It is determined at the step 21 whether or not the calculated value of on-time control data D is larger than a predetermined value Da falling within a range from 50 to 60%, for instance. If the answer is negative or No, the CPU 82 generates, through its output terminal 82c, the calculated value of on-time control data D for controlling the on-time or valve opening period of the EGR control valve 7 starting from the time of generation of a pulse of the aforementioned reference control signal, at the step 22, and at the same time, the CPU 82 generates a high level output as the on-off control changeover signal through its output terminal 82d [(c) of FIG. 4].

If the answer to the question at the step 21 is affirmative or Yes, the CPU 82 calculates the value of off-time control data D' for the EGR control valve in response to operating parameters of the engine, at the step 23, and generates the calculated value D' at the step 24. At the same time, the on-off control changeover command signal is changed to a low level [(c) of FIG. 4]. The value of off-time control data D' represents the ratio of the valve closing period of the EGR control valve 7 to the time interval of adjacent pulses of the timing signal generated by the duty ratio control signal generator 80 and is represented in percentage. The solenoid 7a of the EGR control valve 7 is controlled in energization period or deenergization period in response to the value of on-time control data D or the value of off-time control data D', at the step 25.

The up counter 81 counts reference clock pulses Pc inputted thereto from the time it is reset by a pulse of the reference control signal of (a) of FIG. 4 supplied from the CPU 82 to the time it is again reset by the next pulse of the same control signal, and generates data DA (in percentage) corresponding to the counted value. That is, the maximum value of the data DA varies in response to the time interval between adjacent pulses of the reference control signal. The comparator 83 compares the data DA supplied thereto with the on-time control data D or the off-time control data D', and generates a high level output [(b) of FIG. 4] as long as the relationship DA<D or DA<D' holds. More specifically, in on-time control mode the comparator 83 generates a high level output for a period of time Ton during which the EGR control valve 7 is to be opened, whereas in off-time control mode it generates a high level output for a period of time Toff during which the valve 7 is to be closed.

In on-time control mode, the on-off control changeover command signal generated at the output terminal 82d of the CPU 82 is maintained at a high level [(c) of FIG. 4] as previously noted, and accordingly, as long as the output from the comparator 83 remains at a high level, the AND circuit 85 of the changeover circuit 84 generates a high level output whereby the transistor Tr is in an energized state [(d) of FIG. 4], to keep the solenoid 7a of the EGR control valve 7 energized. Thus, the valve opening period of the EGR control valve 7 is controlled. That is, in on-time control mode, a high level output from the comparator 83 causes opening of the EGR control valve 7, whereas a low level comparator output causes closing of the valve.

On the other hand, in off-time control mode, the changeover command signal is maintained at a low level [(c) of FIG. 4] as previously noted. Accordingly, as long as the output from the comparator 83 remains at a low level, the NAND circuit 86 of the changeover circuit 84 generates a high level output to keep the transistor Tr in an energized state [(d) of FIG. 4]. Thus, the EGR control valve 7 is in an open position with its solenoid 7a energized. That is, a high level output from the comparator 83 causes closing of the EGR control valve 7, whereas a low level comparator output causes opening of the valve 7. In this manner, the off-time or valve closing period of the EGR control valve 7 can be positively controlled, thereby preventing continuity of adjacent pulses of the driving signal or output from the transistor Tr, and accordingly enabling accurate control of the exhaust gas recirculating amount through the EGR control valve 7.

Referring again to FIG. 2, when the throttle valve 3 is in a substantially fully closed position, the vacuum chamber 6a of the exhaust gas recirculation valve 6 is supplied through the conduit 10 with air under a pressure substantially equal to atmospheric pressure, whereby the valve body 6c of the valve 6 is kept in a position closing the junction between the conduits 11, 12 by the force of the spring 6d. Before the valve opening of the throttle valve 3 increases to a predetermined degree from the substantially closed position of the valve 3, the magnitude of vacuum increases with an increase in the valve opening of the throttle valve 3, and accordingly a pressure drop occurs in the vacuum chamber 6a of the exhaust gas recirculation valve 6 so that the diaphragm 6b is displaced toward the vacuum chamber 6a against the force of the spring 6d to bring the valve body 6c into an open position to communicate the conduits 11 and 12 with each other.

On the other hand, the on-off control of the EGR control valve 7 is executed when the vehicle speed is within a predetermined range, e.g. from 15 to 45 km/hr as previously noted. That is, when the vehicle speed is outside the predetermined range, the exhaust gas recirculation is prohibited. This is to prevent a drop in the engine output, which would be caused by the recirculation of exhaust gases at acceleration of the engine from a standing position of the vehicle or at high speed operation of the engine. While the EGR control valve 7 is closed, the communication between the conduits 12, 13 is interrupted, and accordingly no return of exhaust gases from the exhaust pipe 5 to the intake pipe 2 takes place even if the conduits 11, 12 are in communication with each other. On the contrary, while the EGR control valve 7 is open, the communication between the conduits 12, 13 is established to allow return of exhaust gases from the exhaust pipe 5 to the intake pipe 2 through the conduits 13, 12, and 11.

The use of two valves, i.e. the vacuum-responsive exhaust gas recirculation valve 6 and the on-off type solenoid valve 7 makes it possible to achieve accurate control of the exhaust gas recirculation.

What is claimed is:

1. A method for controlling an on-off type solenoid valve, comprising the steps of:
   (1) calculating a valve opening duty ratio determining the valve opening period of said solenoid valve, as a function of at least one control parameter, each time a pulse of a predetermined timing signal is generated;
   (2) comparing the valve opening duty ratio calculated in said step (1) with a predetermined value;
   (3) calculating a valve closing duty ratio determining the valve closing period of said solenoid valve when the calculated valve opening duty ratio is larger than said predetermined value;
   (4) generating a pulse of a reference control signal after completion of either said calculation of the valve opening duty ratio in said step (1) or said calculation of the valve closing duty ratio in said step (3);
   (5) measuring time elapsed after generation of said pulse of said reference control signal;
   (6) causing said solenoid valve to open for a period of time after generation of said pulse of said reference control signal and until the elapsed time measured in said step (5) reaches a value corresponding to the valve opening duty ratio calculated in said step (1), when the calculated valve opening duty ratio is smaller than said predetermined value;
   (7) causing said solenoid valve to close for a period of time after generation of said pulse of said reference control signal and until the elapsed time measured in said step (5) reaches a value corresponding to the valve closing duty ratio calculated in said step (3), when the calculated valve opening duty ratio is larger than said predetermined value.

2. A method as claimed in claim 1, wherein said step (6) includes causing said solenoid valve to close for a period of time after the elapsed time measured in the step (5) reaches said value corresponding to said calculated valve opening duty ratio and until a pulse of said reference control signal immediately following said first-mentioned pulse thereof is generated.

3. A method as claimed in claim 1, wherein said step (7) includes causing said solenoid valve to open for a period of time after the elapsed time measured in the step (5) reaches said value corresponding to said calculated valve closing duty ratio and until a pulse of said reference control signal immediately following said first-mentioned pulse thereof is generated.

4. A method as claimed in claim 1, wherein said calculation of the valve closing duty ratio of the step (3) is effected on the basis of the valve opening duty ratio calculated in the step (1).

5. A method as claimed in claim 1, further including the step of executing a process for control of a controlling means other than said on-off type solenoid valve, in synchronism with generation of a predetermined interrupt signal, and wherein if said interrupt signal is generated to command execution of the process for control of said other controlling means when said calculation of the valve opening duty ratio of the step (1) is to be executed, the process for control of said other controlling means is executed preferentially to said calculation of the valve opening duty ratio of the step (1).

6. A method as claimed in any of claims 1 through 5, wherein said on-off type solenoid valve includes a solenoid valve used in a control means for controlling the amount of exhaust gas recirculated to an intake pipe of an internal combustion engine.

* * * * *